US012808256B2

(12) United States Patent
Brändle

(10) Patent No.: US 12,808,256 B2
(45) Date of Patent: Nov. 24, 2026

(54) SEAL DEVICE

(71) Applicant: ASSA ABLOY (Schweiz) AG, Richterswil (CH)

(72) Inventor: Andreas Brändle, Winterthur (CH)

(73) Assignee: ASSA ABLOY (Schweiz) AG, Richterswil (CH)

( * ) Notice: Subject to any disclaimer, the term of this patent is extended or adjusted under 35 U.S.C. 154(b) by 0 days.

(21) Appl. No.: 18/532,713

(22) Filed: Dec. 7, 2023

(65) Prior Publication Data

US 2024/0191562 A1 Jun. 13, 2024

(30) Foreign Application Priority Data

Dec. 8, 2022 (EP) .................................... 22212165

(51) Int. Cl.
*E06B 7/20* (2006.01)

(52) U.S. Cl.
CPC ..................................... *E06B 7/20* (2013.01)

(58) Field of Classification Search
CPC .......... E06B 7/20; E06B 7/215; E06B 7/2316; E06B 2007/202; E06B 7/21; E06B 7/26
See application file for complete search history.

(56) References Cited

U.S. PATENT DOCUMENTS 1,141,390 A * 6/1915 Godfrey .................... E06B 7/20 49/308
2,035,723 A * 3/1936 Robinson .................. E06B 7/20 49/307
2,552,369 A * 5/1951 Currie ........................ E06B 7/20 49/309
2,555,192 A * 5/1951 Hopkins ................... E06B 7/20 49/308
2,870,495 A * 1/1959 Wetzel ...................... E06B 7/20 160/40
3,072,977 A * 1/1963 Burda ....................... E06B 7/20 49/307
3,199,155 A * 8/1965 Coleman ................ C08L 27/06 160/40

(Continued)

FOREIGN PATENT DOCUMENTS

BR 202022010954 Y1 * 1/2023
CH 273007 4/1951

(Continued)

*Primary Examiner* — Catherine A Kelly
*Assistant Examiner* — Patrick B. Ponciano
(74) *Attorney, Agent, or Firm* — The Webb Law Firm

(57) ABSTRACT

A seal device for a door with a pivotable door leaf includes a drop-down seal for arrangement on or in the door leaf. The drop-down seal has a housing profile rail, a sealing strip, a lowering mechanism, and an actuating part. The seal device includes a triggering module with a rotation element, wherein the triggering module acts on the actuating part when the door leaf is being closed. The triggering module has a guide element for fastening the triggering module on or in the door leaf or fixedly on the housing profile rail. The rotation element is held in a coupling part and the coupling part can be moved relative to the guide element with guidance by the guide element. The seal device makes it possible to use a triggering module optimally in force terms and can also be used in pivot doors, in particular in rebated doors.

7 Claims, 7 Drawing Sheets

(56) References Cited

U.S. PATENT DOCUMENTS

| | | | | | |
|---|---|---|---|---|---|
| 4,805,345 | A * | 2/1989 | Ohi | E06B 7/215 49/308 |
| 7,260,915 | B2 * | 8/2007 | Cronenberg | E06B 7/215 49/306 |
| 8,925,250 | B2 * | 1/2015 | Parker | E06B 7/21 49/306 |
| 10,060,183 | B2 * | 8/2018 | Dintheer | F16B 21/186 |
| 12,345,090 | B2 * | 7/2025 | Brändle | E06B 7/2316 |
| 2005/0193784 | A1 * | 9/2005 | Sanders | E06B 7/215 70/106 |
| 2018/0291674 | A1 * | 10/2018 | Dintheer | E06B 7/18 |
| 2020/0355002 | A1 * | 11/2020 | Kohl | E06B 3/36 |
| 2024/0218731 | A1 * | 7/2024 | Lin | E06B 7/21 |

FOREIGN PATENT DOCUMENTS

| | | | | | |
|---|---|---|---|---|---|
| CN | 206707578 | U | | 12/2017 | |
| CN | 118547978 | A | * | 8/2024 | E06B 7/215 |
| CN | 120291791 | A | * | 7/2025 | E06B 7/20 |
| DE | 20219081 | U1 | | 3/2003 | |
| DE | 102014116747 | A1 | * | 5/2016 | E06B 7/2316 |
| DE | 102016108385 | A1 | | 11/2017 | |
| EP | 1405981 | A1 | * | 4/2004 | E06B 3/4636 |
| EP | 1860272 | A2 | * | 11/2007 | E06B 7/20 |
| EP | 2055887 | A2 | * | 5/2009 | E06B 7/16 |
| EP | 3667010 | A1 | * | 6/2020 | E06B 7/20 |
| GB | 847812 | | | 9/1960 | |
| KR | 20040088109 | A | * | 10/2004 | |
| KR | 1020130049928 | A | | 5/2013 | |
| KR | 101318590 | B1 | * | 10/2013 | E06B 7/21 |
| KR | 20130005834 | U | * | 10/2013 | E06B 7/21 |
| KR | 20140003952 | A | * | 1/2014 | E06B 7/21 |
| KR | 20230059623 | A | * | 5/2023 | E06B 7/18 |
| KR | 102753673 | B1 | * | 1/2025 | E06B 7/215 |
| WO | WO-2016066577 | A2 | * | 5/2016 | E06B 7/18 |

* cited by examiner

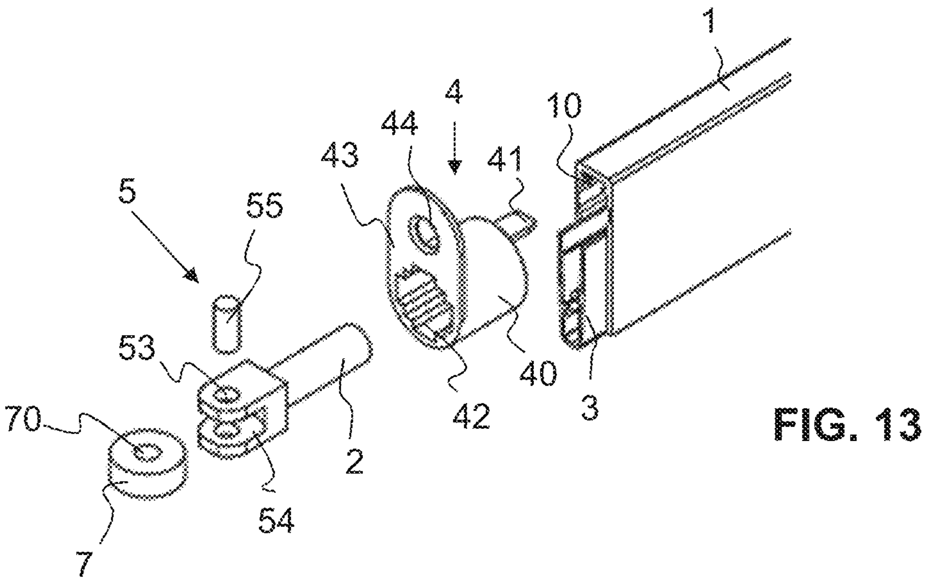
FIG. 13
FIG. 14
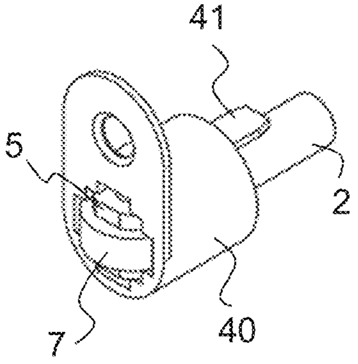
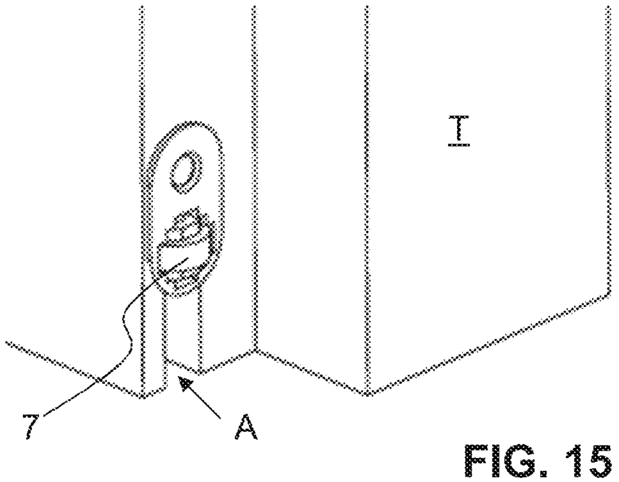
FIG. 15

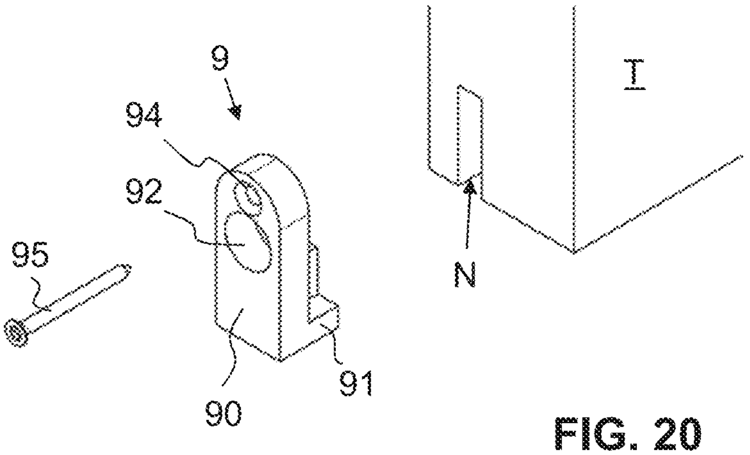
FIG. 20
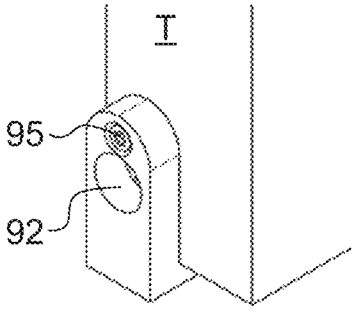
FIG. 21
FIG. 22
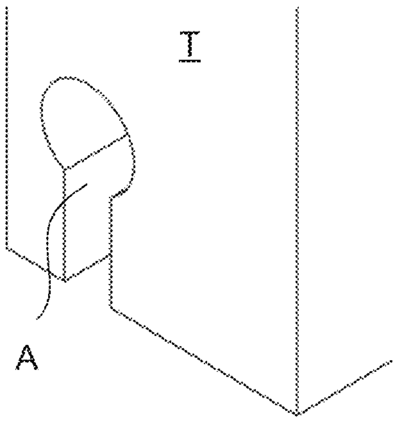

SEAL DEVICE

CROSS REFERENCE TO RELATED APPLICATION

This application claims priority to European Patent Application No. 22 212 165.9, filed Dec. 8, 2022, the disclosure of which is hereby incorporated by reference in its entirety.

BACKGROUND OF THE INVENTION

Field of the Invention

The present invention relates to a seal device for a door, to a triggering module of such a seal device, and to a drilling jig for mounting such a seal device.

Description of Related Art

Door seals are usually used in areas where the ingress of light is to be prevented and/or sound insulation is to be ensured. Door gap seals in the form of drop-down seals usually comprise a housing rail in the form of a U-shaped profile rail, a sealing strip, which is held on or in this housing rail, can be displaced relative to the housing rail and has a sealing element, and a lowering mechanism for lowering and raising the sealing strip. The sealing strip usually drops automatically when the door is being closed, in that a force in the longitudinal direction acts on an actuating part protruding beyond the housing rail and actuates the mechanical lowering mechanism counter to a spring force. The actuating part is usually a rod or a bolt. When the door leaf is being opened, the bolt is rereleased and the lowering mechanism raises the sealing strip again by virtue of the restoring force of the springs. Such drop-down seals can be used not only on a door underside but also laterally in relation to or on the top side of the door. The lowering and raising is therefore to be understood in relation to the housing rail.

When pivotable door leaves are being closed, the triggering bolt abuts the fixed door frame and is pressed in as the door leaf continues to be closed. In the case of pivotable doors, also referred to as pivot doors, the vertical pivot spindle of the door leaf is located inside the door leaf and not, as is the case for other pivotable door leaves, in the door hinge between the door frame and the door leaf. When the pivot-door leaf is being closed, other forces act on the triggering bolt. The closing behaviour is therefore different. The wear on the triggering bolt and on the door frame is therefore more considerable.

DE 102016108385 A1 discloses a mechanically actuatable drop-down seal for a pivot door. The drop-down seal has a housing and a trigger which protrudes beyond the end face of the housing and has a rotatably mounted rotation element for bearing against a fixed stop surface. The rotation element is a ball bearing or roller bearing with a rotary spindle extending perpendicularly in relation to the longitudinal direction of the drop-down seal. The rotation element forms the free end of the rod-shaped trigger. A fixed stop surface, which forms a run-up ramp with a peak, is present on the fixed case.

EP 3 667 010 A1 describes a stop device for a pivot door, wherein the stop device has a roller which is held rotatably in a roller carrier. The stop device is fastened to the fixed case of the door.

Furthermore, DE 202 19 081 U1 discloses a sliding door comprising a drop-down seal with a housing and a trigger, which is arranged pivotably in the housing and is intended for actuating a mechanism for lowering a sealing strip. The trigger is in the form of a lever element which has a roller for making contact with the fixed door frame.

KR 20130049928 A also describes a drop-down seal with a triggering lever and a roller arranged thereon.

The known solutions have the disadvantage that they require a relatively large amount of space and thus are virtually impossible to use for a narrow vertical door gap, as often arises in the case of pivot doors. The drop-down seals must therefore be correspondingly adapted. Moreover, at least for some of the proposed solutions specially shaped run-up ramps are required. It is also virtually impossible to adapt these seal devices to the local conditions, in particular to the respective dimensions of the gap.

SUMMARY OF THE INVENTION

It is therefore an object of the invention to provide an improved seal device for a door, which can be used for pivot doors.

The seal device according to the invention for a door having a pivotable door leaf comprises a drop-down seal for arrangement on or in the door leaf, wherein the drop-down seal has a housing profile rail, a sealing strip which can be raised and lowered relative to the housing profile rail, a lowering mechanism for raising and lowering the sealing strip, and an actuating part. The actuating part actuates the lowering mechanism when the door leaf is being closed. The seal device comprises a triggering module with a rotation element, wherein the triggering module acts on the actuating part when the door leaf is being closed. The triggering module has a guide element, which is designed for fastening the triggering module on or in the door leaf or is fixedly arranged on the housing profile rail. The rotation element is held in a coupling part and the coupling part can be moved relative to the guide element with guidance by the guide element.

The coupling part is arranged movably, in particular displaceably, relative to the guide element. This makes it possible to hold the rotation element on the door leaf with at the same time the transmission of force to the actuating part when the door leaf is being closed.

The rotation element thus acts on the actuating part, i.e. the trigger, of the drop-down seal without needing to be connected thereto. The guide element serves as a guide, preferably a lateral guide. This guide is present irrespective of whether the rotation element is connected to or loosely arranged in relation to the actuating part. In the case of the rotation element, or the coupling part, making loose contact with the actuating part, the forces acting when the door is being opened and closed are decoupled. It is possible in particular to minimize transverse forces, which act in particular negatively on the lowering mechanism.

This seal device can be used for all door types, but in particular for rebated doors and for pivot doors. It is advantageous that the triggering module can have a relatively small design and the device can thus also be used for narrow door leaves.

This seal device can be used not only on a door underside, but also laterally in relation to or on the top side of the door. The lowering and raising is therefore to be understood in relation to the housing rail.

In a preferred embodiment, the actuating part defines a longitudinal direction, wherein the coupling part and the rotation element are arranged along this longitudinal direction. That is to say, the rotation element is preferably situated on the end face of the actuating part that faces towards the door frame. It preferably at least partially protrudes beyond the end face of the door leaf. This reduces the space requirement in the door leaf. The rotation element preferably protrudes beyond the actuating part. The coupling part is preferably guidedly displaceable in the longitudinal direction relative to the guide element.

In some embodiments, the coupling part is part of the actuating part, and preferably it is formed in one piece together with the actuating part or is detachably or fixedly fastened on or connected to the actuating part.

In other preferred embodiments, the coupling part makes unconnected contact with the actuating part, i.e. is not fastened to it, but instead can move away from it. The contact is made at least in the actuated, i.e. lowered, state of the seal device. In the raised state, depending on the embodiment or setting of the seal device, there is a gap between the coupling part and the actuating part, or they continue to make contact with one another.

The guide element is preferably a mounting sleeve in which the coupling part is guidedly held.

In preferred embodiments, the mounting sleeve has a wall for bearing against an end face of the door leaf. As a result, the mounting sleeve can be easily fastened on the end side of the door leaf, similarly to the known fastening brackets of the known drop-down seals.

The mounting sleeve preferably has means for fastening the drop-down seal on the door leaf. This facilitates the mounting and minimizes the space requirement, since the same means is used to mount the rotation element and the housing profile rail of the drop-down seal.

The means is preferably a protruding lug for engagement in the housing rail of the drop-down seal. The type of mounting for the drop-down seal therefore corresponds to the known fastening means using a holding bracket, which has proven successful.

In some embodiments, the rotation element is a ball, which is preferably rotatably held in a receiving opening of the coupling part. Other types of mounting for the ball are possible. The way described here, however, minimizes the components and the space requirement. It preferably forms a ball bearing.

In other embodiments, the rotation element is a roller or a wheel, which is rotatably held in a slot in the coupling part. The terms "roller" and "wheel" are treated as synonyms in this text. Compared to the ball, the roller has the advantage of a larger running surface. In particular, contact with the door frame is not made at certain points but over an area.

In some embodiments, the coupling part has a sleeve-shaped or a cuboidal main body. The sleeve-shaped design is suitable in particular, but not exclusively, when use is made of a spherical rotation element, and the cuboidal design when use is made of a roller.

In some embodiments, the coupling part can be slid into the through-opening in the guide element, in particular in the mounting sleeve, in a well-defined position and/or is received in the through-opening in a well-defined position. For example, the receiving opening is round and the cross section of the coupling part is also round. In other embodiments, multiple positions are possible which are, however, not equivalent. For example, the receiving opening and the cross section of the coupling part are rectangular or square, with the result that there are two or four rotational positions, respectively, for introducing the coupling part, without the end results being different from one another.

In other embodiments, the guide element, in particular the mounting sleeve, enables at least two different holding positions for the coupling part in which the coupling part is guidedly held.

If the guide element is a mounting sleeve, it preferably has a through-opening with a shape which enables at least two different mounting positions for the coupling part. For example, the through-opening is cruciform and the coupling part has a rectangular cross-section. This is advantageous in particular when the rotation element used is a roller.

In a first holding or mounting variant, the axis of rotation of the roller can thus extend parallel to the movement of the sealing strip of the drop-down seal. When the seal device is used to provide sealing with respect to a floor or a ceiling, this corresponds to a parallel alignment of the axis of rotation of the roller with respect to the pivot axis of the door leaf. In the second holding or mounting variant, however, it extends perpendicularly in relation to the pivot axis of the door leaf and thus transversely to the pivot axis of the door leaf. In the event of installation of the seal device in a vertical end face of the door leaf, however, the axis of rotation of the roller extends parallel to the pivot axis of the door leaf in this second holding or mounting variant. This increases the application flexibility of the seal device.

The triggering module according to the invention can be used with new drop-down seals for new doors. Existing drop-down seals with the triggering module according to the invention can, however, also already be retrofitted in doors. The triggering module according to the invention has a rotation element and a guide element in the form of a mounting sleeve for fastening the triggering module on or in the door leaf or on the housing profile rail. The rotation element is held in a coupling part, wherein the coupling part can be moved relative to the guide element with guidance by the guide element. It is preferably displaceable. As a result, the triggering module can be fastened on the door frame and used with the drop-down seal without the rotation element needing to be connected to the actuating part of the drop-down seal. It is possible to optimize the forces, in particular transverse forces, which act when the door is being opened and closed.

The mounting sleeve can be fastened on the door leaf. However, it is preferably arranged in a recess in the door leaf. The drilling jig according to the invention makes it easier to create the recess required for the mounting sleeve, in particular that part which goes beyond a rectangular groove in the door leaf.

The inventive drilling jig thus serves to mount the aforementioned seal device in a door leaf having a groove. The drilling jig has a main body for bearing against the door leaf, wherein a sliding block for engagement in the groove of the door leaf is integrally formed on the main body. A drill hole for introducing a drill to enlarge the groove in the door leaf is also present in the main body. This makes it possible to introduce the drilling jig into the groove, which has usually already been created in the factory, and the additional drill hole can be easily made using the drilling jig without remeasurement or further adjustment. The groove usually already corresponds to the dimensions of the drop-down seal to be introduced therein.

BRIEF DESCRIPTION OF THE DRAWINGS

The terms Fig., Figs., Figure, and Figures are used interchangeably in the specification to refer to the corresponding figures in the drawings Preferred embodiments of the invention are described below on the basis of the drawings, which serve merely for elucidation and are not to be interpreted as limiting. In the drawings:

FIG. 13 shows an exploded illustration of a triggering module and part of a drop-down seal in a third embodiment of the seal device according to the invention;

FIG. 14 shows a perspective illustration of the triggering module with actuating part according to FIG. 13;

FIG. 15 shows the triggering module according to FIG. 13 in the mounted state in a door leaf;

FIG. 20 shows the drilling jig according to FIG. 18 when used with a door leaf;

FIG. 21 shows the drilling jig according to FIG. 18 connected to the door leaf and FIG. 22 shows the recess in the door leaf obtained by means of the drilling jig.

Parts which are the same are provided with the same reference signs.

DESCRIPTION OF THE INVENTION

Figure 1:
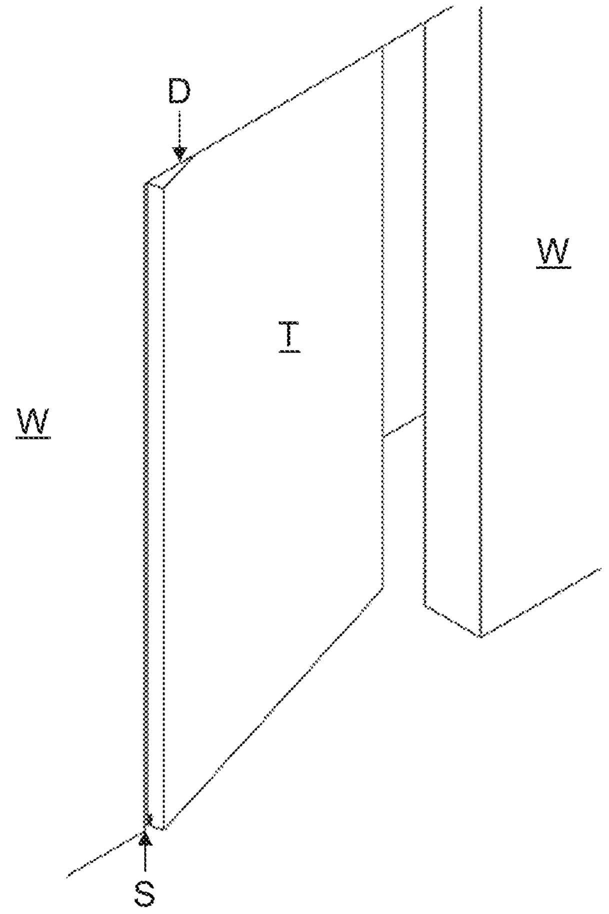
FIG. 1 shows a perspective illustration of a pivot door having a seal device according to the invention.

FIG. 1 shows a building situation with a wall W, in which a pivot door with a pivotable door leaf T is formed. As can be seen in FIG. 1, the door pivot axis D is located in the door surface. A recess for receiving a seal device S is formed in the bottom end face of the door leaf T. In other embodiments, a recess and a seal device S arranged therein are alternatively or additionally present on the top end face and/or the lateral end faces of the door leaf T. Instead of arrangement in a recess, the seal device S can also be fastened for example on the door leaf T.

Depending on the embodiment, the wall W itself forms the frame for the door leaf T, or a case arranged in the wall opening is present.

FIGS. 2 to 5 illustrate a first embodiment of the seal device according to the invention.

Figure 2:
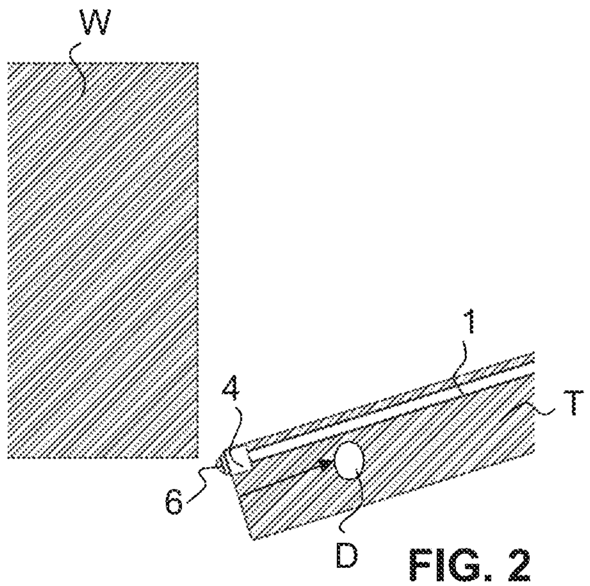
FIG. 2 shows a cross section through part of the pivot door according to FIG. 1, while the door leaf is being closed.
Figure 3:
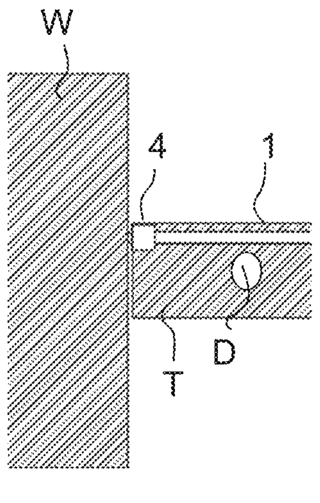
FIG. 3 shows a cross section through part of the pivot door according to FIG. 1, with the door leaf closed.

FIGS. 2 and 3 show the wall W and part of the door leaf T. In FIG. 3 the door leaf T is closed and in FIG. 2 it is in a state while the door is being closed. The embodiments illustrated in the rest of the figures are also preferably arranged on or in the door leaf T in this way and preferably have the drop-down seal described below.

Figure 4:
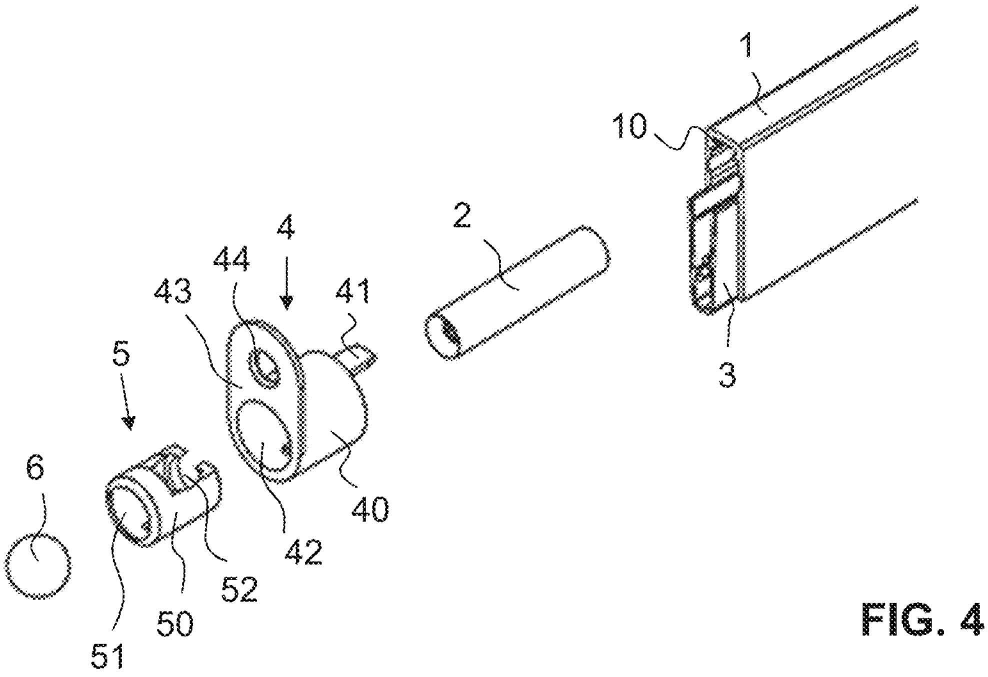
FIG. 4 shows an exploded illustration of a triggering module and part of a drop-down seal of the seal device according to the invention as per FIG. 1.
Figure 6:
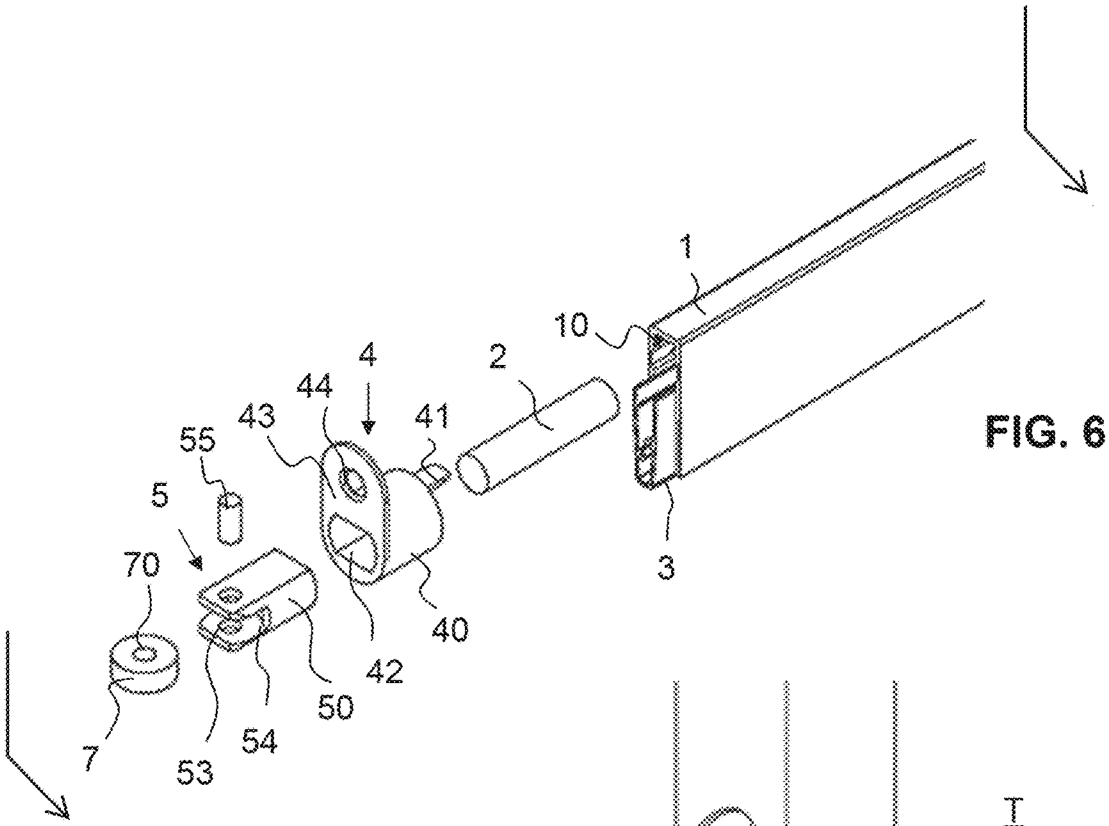
FIG. 6 shows an exploded illustration of a triggering module and part of a drop-down seal in a second embodiment of the seal device according to the invention.

The seal device S has a drop-down seal, which is arranged in a recess A in the door leaf T. The drop-down seal is preferably a seal of the known type. The drop-down seal illustrated in FIGS. 4, 6 and 13 is preferred, but is to be understood merely as an example. It comprises a housing profile rail 1 with a U-shaped, downwardly open cross section. A sealing strip is held on or in the housing profile rail 1 and can be moved relative to the housing profile rail 1 in a direction perpendicular to the longitudinal direction of the sealing strip and thus also of the housing profile rail 1. It can thus be raised and lowered. The sealing strip is connected to the housing profile rail 1 via a lowering mechanism. The lowering mechanism has a different design depending on the embodiment. It preferably has leaf springs and a longitudinally extending slide 8. This lowering mechanism is known in the prior art. Alternative lowering mechanisms can likewise be used.

The sealing strip has a carrier profile rail and a sealing profile 3 integrally formed or fastened thereon. The carrier profile rail cannot be seen in the figures. It is arranged inside the housing profile rail 1. The sealing profile 3 extends at least over the entire length, or height, of the door leaf T and rests sealingly on the floor, the ceiling or the lateral door frame when the sealing strip has been lowered. In this example, the device provides downward sealing with respect to the floor.

Figure 9:
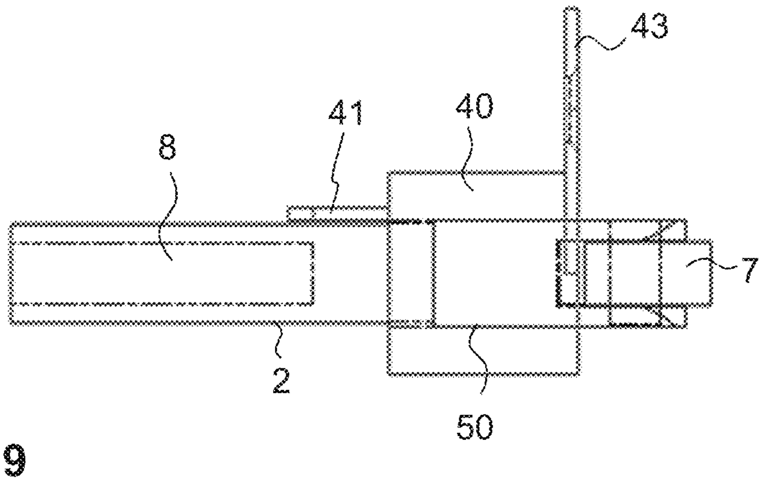
FIG. 9 shows a cross section through the triggering module and through part of the drop-down seal according to FIG. 6.

An actuating part 2 protrudes beyond the end face of the carrier profile rail and/or the housing profile rail 1. The actuating part 2 is preferably in the form of a bolt or a rod. Depending on the embodiment, it is hollow or solid. It preferably has an external or an internal thread for connection to the slide. In this example, as can be seen in FIG. 9, there is an internal thread in which the slide 8 of the lowering mechanism is screwed.

The actuating part 2 acts on the lowering mechanism via the connection to the slide 8. If it is pressed in towards the housing profile rail 1, the lowering mechanism lowers the sealing strip, preferably counter to the spring force. If the pressure on the actuating part 2 is stopped, i.e. the actuating part 2 is rereleased, the sealing strip is raised again owing to the restoring force of the springs.

The sealing profile 3 preferably protrudes beyond the carrier profile rail and preferably also from the housing profile rail 1. Depending on the embodiment, the sealing profile 3 can be extended by “kneading out” or it is designed such that it can be expanded or extended in another way. It preferably sealingly abuts the vertical door frame, or the case, when the door is closed and thus forms not only a seal with respect to the floor, but also an end-side seal.

It also preferably protrudes beyond the end side of the adapter part 7, with the result that it sealingly abuts the vertical door frame, or the case, when the door leaf is closed. That is to say, it forms an end-side seal.

The seal device also has a triggering module, as can be seen in FIGS. 2 and 3. The triggering module forms the end side of the seal device and is preferably likewise arranged in the recess A in the door leaf T.

As can be clearly seen in FIG. 4, the triggering module has a guide element, preferably in the form of a mounting sleeve 4, a coupling part 5 and a rotation element, in this case a ball 6. The mounting sleeve 4 has a hollow-cylindrical main body 40, which forms a through-opening 42. A longitudinally protruding lug 41 is integrally formed on a first end face of the main body 40 and a flange, which forms a preferably plane-parallel wall 43, is present on the oppositely situated end face. A fastening opening 44 for a fastening element, preferably for a screw or a nail, is present in the wall 43.

In this embodiment, the coupling part 5 likewise has a hollow-cylindrical main body 50. Its outside diameter is dimensioned such that it can be longitudinally displaceably held in the through-opening 42 in the mounting sleeve 4.

The main body 50 of the coupling part 5 has a receiving opening 51. The receiving opening 51 is in the form of a bearing for a ball 6. The design of such ball bearings are known.

The main body 50 of the coupling part 5 has, at its end facing towards the drop-down seal, a flattened portion 52 in the circumference. The flattened portion 52 serves as a cutout for the lug 41.

The coupling part 5 is pushed into the mounting sleeve 4 together with the rotatably mounted ball 6. It can be fastened on the end face of the door leaf T by means of a screw, which is not illustrated here. By virtue of the protruding lug 41, the drop-down seal can be fastened on the door leaf at the same time. For this, the lug 41 is pushed into the groove 10 formed underneath a bar of the housing profile rail 1.

In other embodiments, the housing profile rail 1 and the triggering module are fastened on the door leaf separately. In further embodiments, the triggering module, in particular the guide element, is integrally formed or detachably or non-detachably fastened on the housing rail 1.

Figure 5:
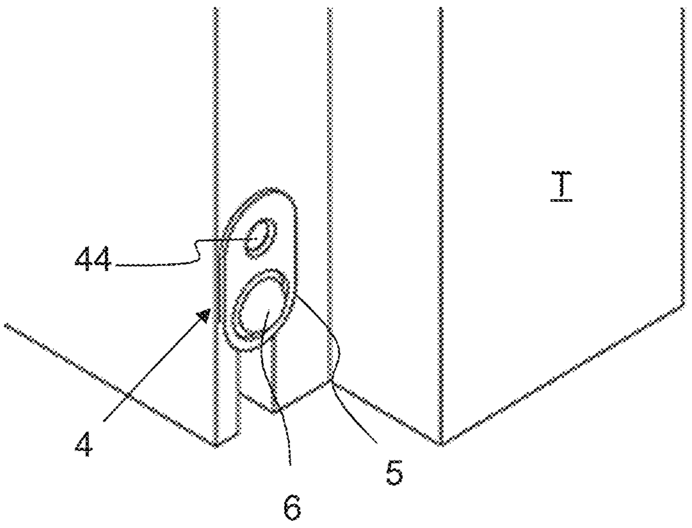
FIG. 5 shows the triggering module according to FIG. 4 in the mounted state in a door leaf, the drop-down seal not being illustrated.

FIG. 5 illustrates the assembled state, mounted on the door leaf F, of the triggering module. The drop-down seal is not illustrated in this figure, although it is usually fastened together with the triggering module.

In this example, the actuating part 2 is not connected to the coupling part 5. It makes contact only with the coupling part 5. This happens no later than when the ball 6 rolls on the door frame, or the case, when the door is being closed and the coupling part 5 is pressed into the mounting sleeve 4, and thus also pushes the actuating part 2 into the housing rail 1. As a result, the lowering mechanism is activated counter to a spring force and the sealing strip with the sealing profile 3 is lowered. When the door is being opened, there is no pressure on the ball 6. The sealing strip is then raised again thanks to the spring force of the return springs and the actuating part 2 is displaced in the opposite direction, i.e. in the direction of the end face of the housing rail 1. As a result, it pushes the coupling part 5 and the ball 6 outwards again.

In other embodiments, the actuating part 2 according to FIG. 4 is connected to the coupling part 5, either fixedly or flexibly, for example via a spring. This fixed or flexible connection is preferably detachable.

FIGS. 6 to 12 illustrate a second embodiment of the seal device according to the invention. The drop-down seal with the housing profile rail 1, the sealing strip with the sealing profile 3, the lowering mechanism, which is not illustrated, and the actuating part 2 have already been described on the basis of the first exemplary embodiment. The description above also applies here.

The mounting sleeve 4 has the same design as in the first exemplary embodiment, except for the fact that the cross section of the through-opening 42 is not round, but elongate. The cross section preferably has the shape of a horizontal rectangle with rounded short sides.

The coupling part 5 has a cuboidal main body 50 with a slot 54, which forms a receiving fork for receiving the rotation element. The rest of the main body 50 preferably has a solid form in this example. That is to say, its end face that faces towards the drop-down seal preferably has a closed form.

The rotation element is a wheel or a roller 7 in this example. The roller 7 has a preferably central through-opening 70. A respective through-opening 53, which are in line with one another, is formed in the two arms of the main body in the region of the slot 54. The roller 7 can be rotatably mounted in the receiving fork by means of a bolt 55 guided through the two through-holes 53. In this arrangement, the axis of rotation of the roller 7 extends in the bolt 55 and thus parallel to the pivot axis D of the door leaf T, or parallel to the direction of movement of the sealing strip.

In another embodiment, which is not illustrated here, the longitudinal direction of the through-opening 42 in the mounting sleeve 4 extends parallel to the direction of movement of the sealing strip. In this case, the axis of rotation of the roller likewise extends parallel to the pivot axis D of the door leaf T, but perpendicularly in relation to the direction of movement of the sealing strip.

Figure 7:
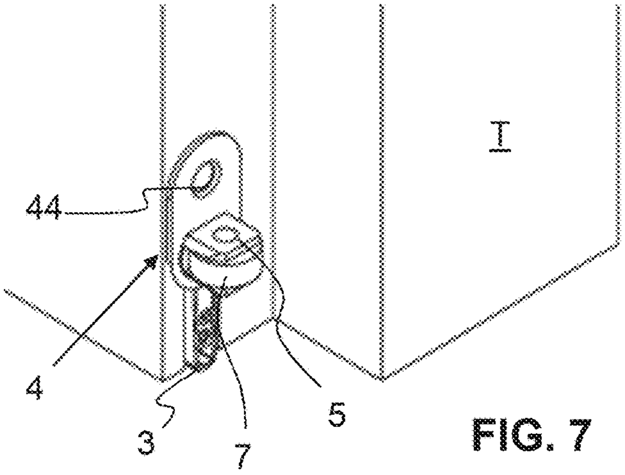
FIG. 7 shows the triggering module according to FIG. 6 in the mounted state in a door leaf.

FIG. 7 illustrates the triggering module according to the invention together with the drop-down seal in a recess A of a pivotable door leaf. The fastening screw for fastening, which is screwed in through the fastening opening 44, is not illustrated. In this embodiment, the roller 7 protrudes laterally beyond the coupling part 5 and in its diagonals is not received in the through-opening 42. In other embodiments, however, the receiving opening 42 has a stepped form, with the result that the roller 7 can be received deeper in the through-opening 42 in the mounting sleeve 4 and thus deeper in the recess A in the door leaf T. A stepped design is shown, for example, in the variants according to FIGS. 13 and 17.

Figure 8:
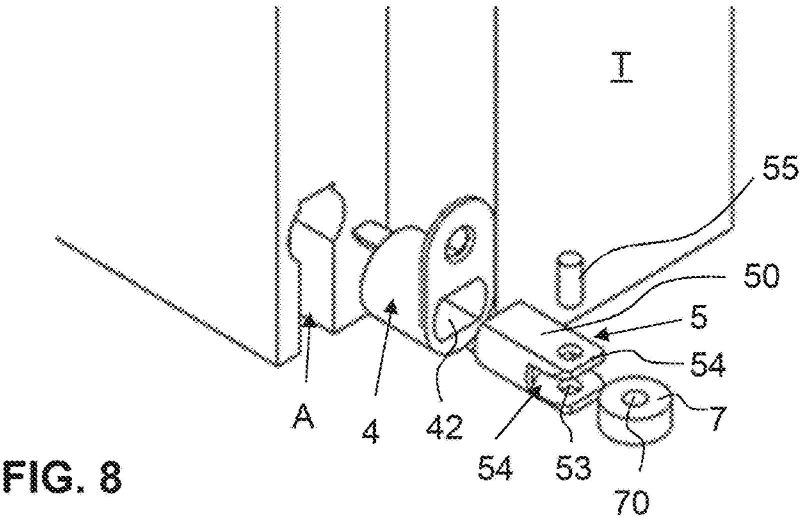
FIG. 8 shows an exploded illustration of the triggering module and the door leaf according to FIG. 6.

In FIG. 8, the shape of the recess A can be clearly seen. It is composed of a known groove with plane-parallel side walls for receiving the housing profile rail 1 of the drop-down seal and a widened portion formed on the upper end of the groove. The widened portion preferably corresponds to the outer shape of the main body 40 of the mounting sleeve 4. The height of the recess preferably corresponds approximately to the height of the housing profile rail 1, i.e. it also preferably projects into the widened portion.

Figure 10:
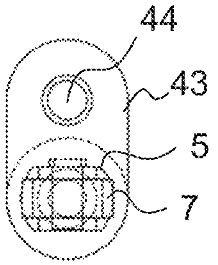
FIG. 10 shows a front view of the triggering module and part of the drop-down seal according to FIG. 6.
Figure 11:
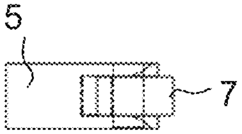
FIG. 11 shows a cross section through a coupling part and the roller of the triggering module according to FIG. 6.

In FIGS. 9 to 11, the assembly of the seal device according to the invention can be clearly seen. In FIG. 9, it can be seen that the slide 8 is connected to the actuating part 2. It can also be seen that the free end of the actuating part 2 abuts the end face of the main body 50 of the coupling part 5. As has already been described on the basis of the first example, there is preferably only contact, but no fixed or flexible connection, between the actuating part 2 and the coupling part 5. The coupling part 5 is displaceable relative to the main body 40 of the mounting sleeve, being displaceably mounted therein.

Figure 12:
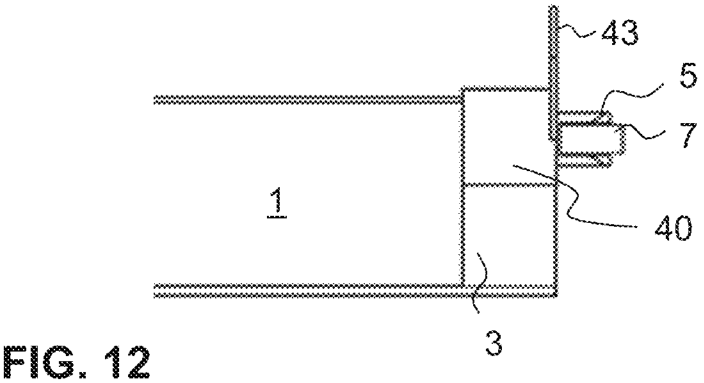
FIG. 12 shows a side view of the triggering module and part of the drop-down seal according to FIG. 6.

In FIG. 12, the sealing profile 3 is already partially kneaded out, with the result that it extends at least as far as the wall 43. Depending on the lowering mechanism, this is already sufficient for an end-side seal in the lowered state. A reason for this is that, as it lowers, the sealing strip is usually also displaced in the longitudinal direction, specifically towards the trigger side.

FIGS. 13 to 15 illustrate a further exemplary embodiment. This example has substantially the same design as the second exemplary embodiment. The differences lie in the design both of the coupling part 5 and the through-opening 42 in the mounting sleeve 4. These two differences may also be brought about independently of one another. That is to say, the second exemplary embodiment according to FIGS. 6 to 12 can also be further developed with only one of these differences.

In this example, the coupling part 5 is formed in one piece with the actuating part 2. In a variant, the actuating part 2 is fixedly connected to the coupling part 5. This fixed connection, depending on the embodiment, is detachable or is not detachable nondestructively.

The through-opening 42 in the mounting sleeve 4 has a cruciform design, with the result that the coupling part 5 can be received in two different alignments. In the first alignment, the bolt 55 and thus the axis of rotation of the roller 7 extends parallel to the direction of movement of the sealing strip with the sealing profile 3. In the second alignment, the bolt and the axis of rotation of the roller extend perpendicularly in relation to the direction of movement of the sealing strip. What is meant by direction of movement is the main movement of the sealing strip perpendicularly in relation to the longitudinal direction of the housing profile rail or the sealing strip.

The through-opening 42 in the mounting sleeve 4 has a stepped form, and then the diameter of the roller 7 is received in the through-opening 42 in the two alignments. This can be clearly seen in FIG. 14.

FIG. 15 illustrates the installation situation in a door leaf, in this case a rebated door. The drop-down seal, which is usually fastened together with the triggering module, is not illustrated. Comparing FIGS. 7 and 15 shows that, in the example according to FIG. 15, the roller 7 protrudes beyond the wall 43 of the mounting sleeve 4 and thus the end face of the door leaf to a lesser extent.

Figure 16:
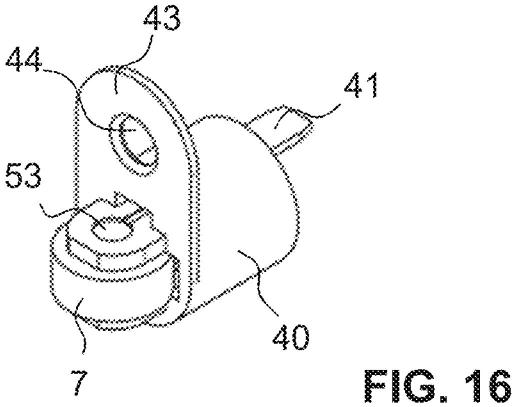
FIG. 16 shows a perspective illustration of a triggering module in a fourth embodiment of the seal device according to the invention.
Figure 17:
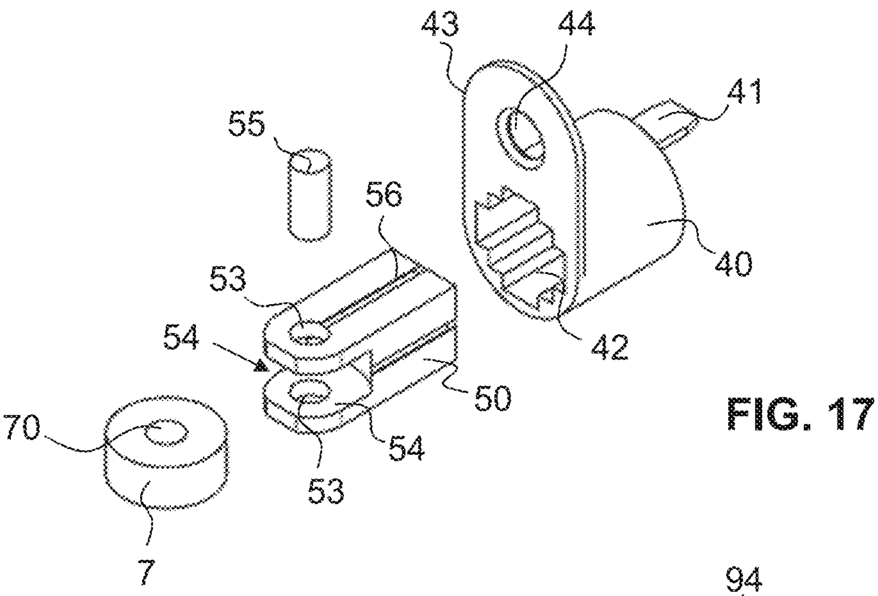
FIG. 17 shows an exploded illustration of the triggering module according to FIG. 16.

FIGS. 16 and 17 illustrate a fourth exemplary embodiment. The difference in relation to the third exemplary embodiment according to FIGS. 13 to 15 is that that coupling part 5 has a different design. It is not connected to the actuating part 2. The main body 50 has a correspondingly longer design. Its length is similar to or the same as that of the second exemplary embodiment according to FIGS. 6 to 12.

The main body 50 preferably has grooves 56, which extend from the openings, i.e. the through-openings 53 and the slot 54, to the end facing towards the actuating part 2. The grooves 56 each have an elevation at the end opposite the through openings 53 and are used for latching the main body 50 into the mounting sleeve 4. The mounting sleeve 4 preferably has corresponding latching-in elements.

Door leaves T usually have grooves N that have already been made in the factory with parallel side walls. The height and width of the grooves are dimensioned such that they can receive the housing rails of the drop-down seals. The dimensions for this are usually standardized. In order now to be able to easily introduce the additional widened portion for receiving the mounting sleeve 4 into already manufactured door leaves, a drilling jig 9 can be used. A preferred exemplary embodiment is illustrated in FIGS. 18 and 19.

Figure 18:
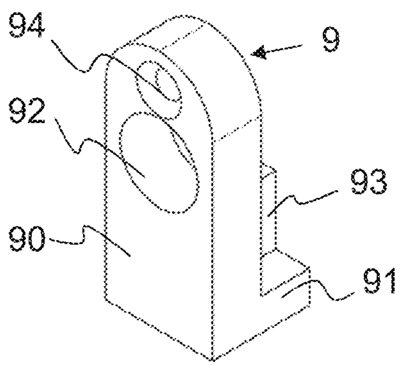
FIG. 18 shows a first perspective illustration of a drilling jig according to the invention.
Figure 19:
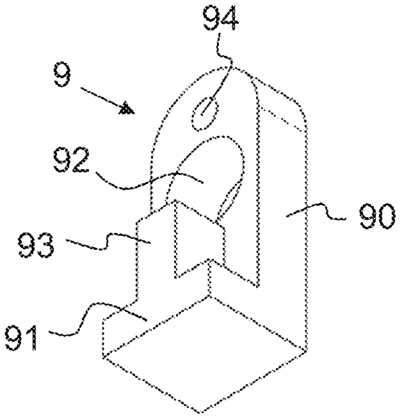
FIG. 19 shows a second perspective illustration of the drilling jig according to FIG. 18.

The drilling jig according to FIGS. 18 and 19 has a substantially cuboidal main body 90, on which a foot 91 which preferably protrudes on one side is formed. A sliding block 93, the width of which corresponds to one of the known dimensions of the prefabricated door grooves N, is integrally formed on the upper surface of the foot 91 and that side of the main body 90 that faces towards this upper surface.

Above the sliding block 93 and preferably adjoining it, the main body 90 has a drill hole 92, the inside diameter of which corresponds to the desired dimension in the widened portion to be introduced into the groove N. The drill hole 92 ends exactly at or only slightly above the standard height of the prefabricated groove N.

Above the drill hole 92, a continuous fastening opening 94 is preferably present in the main body 90.

The drilling jig is formed in one piece. It is preferably made from metal. However, it may also be made from other materials, such as wood or a plastic.

FIGS. 20 to 22 now show how the drilling jig can be used. Its sliding block 93 is pushed into the prefabricated groove N in the door leaf T. In the process, the foot 91 is pushed under the door leaf T. If it hangs out of the door leaf T, as is usually the case, the foot 91 serves as a stop. The door leaf T is processed horizontally rather than upright, as illustrated.

Then the screw 95, which is subsequently also used to fasten the mounting sleeve 4, can be screwed into the drilling jig 9. As a result, for the one part, the drilling jig 9 is fixed to the door leaf T. For the other part, the fastening hole for the mounting sleeve 4 is already made in the door leaf T, without further work steps being needed for this.

The drill hole 92 in the drilling rig 9 mounted according to FIG. 21 then serves as a specification for drilling a hole in the door leaf T. The result is illustrated in FIG. 22. It was therefore possible to create the designed recess A for mounting the seal device according to the invention in few work steps. The small hole for introducing the screw 95 when the mounting sleeve 4 is being fastened on the door leaf is not illustrated in FIG. 22, but it is present.

The seal device according to the invention makes it possible to use a triggering module optimally in force terms and can also be used in pivot doors, in particular in rebated doors.

The invention claimed is:

1. A seal device for a door with a pivotable door leaf, wherein the seal device comprises a drop-down seal for arrangement on or in the door leaf, wherein the drop-down seal has a housing profile rail comprising a groove, a sealing strip which can be raised and lowered relative to the housing profile rail, a lowering mechanism for raising and lowering the sealing strip, an actuating part being a rod and defining a longitudinal direction, wherein the actuating part actuates the lowering mechanism when the door leaf is being closed, and a triggering module acting on the actuating part when the door leaf is being closed, wherein the triggering module has a rotation element, a coupling part and a guide element, wherein the rotation element is held in the coupling part, wherein the guide element is a mounting sleeve for fastening the triggering module on a door frame, the mounting sleeve comprising a cylindrical main body with a through-opening, a lug for engagement in the housing profile rail, the lug protruding from a first end face of the main body in longitudinal direction and being pushed in the groove of the housing profile rail, and a flange for bearing against an end face of the door leaf, wherein the flange is arranged on a second end face of the main body, the second end face being opposite to the first end face, a distance between the first end face and the second end face being larger than a width of the flange in the longitudinal direction, wherein the flange protrudes from the main body perpendicular to the longitudinal direction, and the main body protrudes the flange in the longitudinal direction, wherein the coupling part and the rotation element are arranged along the longitudinal direction, wherein the coupling part is guidedly held displaceable in the longitudinal direction relative to the guide element, wherein the coupling part is received in the through-opening of the main body and the coupling part can be guidedly moved within the through-opening relative to the main body with guidance by the main body, and wherein the first end face of the main body is, in longitudinal direction, arranged in front of the housing profile rail.

2. The seal device according to claim 1, wherein the rotation element protrudes beyond the actuating part.

3. The seal device according to claim 1, wherein the rotation element is a ball rotatably held in a receiving opening of the coupling part.

4. The seal device according to claim 1, wherein the rotation element is a roller rotatably held in a slot in the coupling part.

5. The seal device according to claim 1, wherein the coupling part has a sleeve-shaped or cuboidal main body.

6. The seal device according to claim 1, wherein the guide element enables at least two different holding positions for the coupling part in which the coupling part is guidedly held.

7. A triggering module of a seal device for a door with a pivotable door leaf, wherein the seal device comprises a drop-down seal for arrangement on or in the door leaf, wherein the drop-down seal has a housing profile rail comprising a groove, a sealing strip which can be raised and lowered relative to the housing profile rail, a lowering mechanism for raising and lowering the sealing strip, an actuating part being a rod and defining a longitudinal direction, wherein the actuating part actuates the lowering mechanism when the door leaf is being closed, and the triggering module acting on the actuation part when the door leaf is being closed, wherein the triggering module has a rotation element, a coupling part and a guide element, wherein the rotation element is held in the coupling part, wherein the guide element is a mounting sleeve for fastening the triggering module on a door frame, the mounting sleeve comprising a cylindrical main body with a through-opening, a lug for engagement in the housing profile rail, the lug protruding from a first end face of the main body in longitudinal direction and being pushed in the groove of the housing profile rail, and a flange for bearing against an end face of the door leaf, wherein the flange is arranged on a second end face of the main body, the second end face being opposite to the first end face, a distance between the first end face and the second end face being larger than a width of the flange in the longitudinal direction, wherein the flange protrudes from the main body perpendicular to the longitudinal direction, and the main body protrudes the flange in the longitudinal direction, wherein the coupling part and the rotation element are arranged along the longitudinal direction, wherein the coupling part is guidedly held displaceable in the longitudinal direction relative to the guide element, wherein the coupling part is received in the through-opening of the main body and the coupling part can be guidedly moved within the through-opening relative to the main body with guidance by the main body, and wherein the first end face of the main body is, in longitudinal direction, arranged in front of the housing profile rail.

* * * * *